United States Patent
Ono et al.

(10) Patent No.: US 7,321,451 B2
(45) Date of Patent: Jan. 22, 2008

(54) DATA CONVERTING CIRCUIT, DATA CONVERTING METHOD, AND IMAGE FORMING APPARATUS

(75) Inventors: Shunichi Ono, Tagata-gun (JP); Hidenori Kobayashi, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 993 days.

(21) Appl. No.: 10/390,642

(22) Filed: Mar. 19, 2003

(65) Prior Publication Data

US 2004/0186919 A1   Sep. 23, 2004

(51) Int. Cl.
*G06K 15/00* (2006.01)
*G06K 13/28* (2006.01)
*G06F 13/00* (2006.01)

(52) U.S. Cl. .............. 358/3.23; 710/25; 710/3
(58) Field of Classification Search ............ 358/1.15, 358/1.9, 3.23, 1.16; 710/1, 3, 9, 26, 68, 25; 347/15; 382/300, 299; 370/532
See application file for complete search history.

(56) References Cited

U.S. PATENT DOCUMENTS 6,058,222 A * 5/2000 Hashimoto .................. 382/300
6,934,057 B1 * 8/2005 Namizuka .................... 358/2.1

FOREIGN PATENT DOCUMENTS

JP        9-116773 A      5/1997

* cited by examiner

*Primary Examiner*—Jerome Grant, II
(74) *Attorney, Agent, or Firm*—Foley & Lardner LLP

(57) ABSTRACT

A data converting circuit to receive an input data and convert the input data into an output data is disclosed. An output data group corresponding to the value of the input data is stored beforehand in an output data table. A multiplexer receives the input data and in accordance with the input data, selectively outputs one data out of the output data group stored in the output data table. A specific digit output circuit receives the input data and in accordance with the result of comparing the input data with the boundary information stored in advance, outputs a specific digit output data included in the output data but not output by the multiplexer.

4 Claims, 4 Drawing Sheets

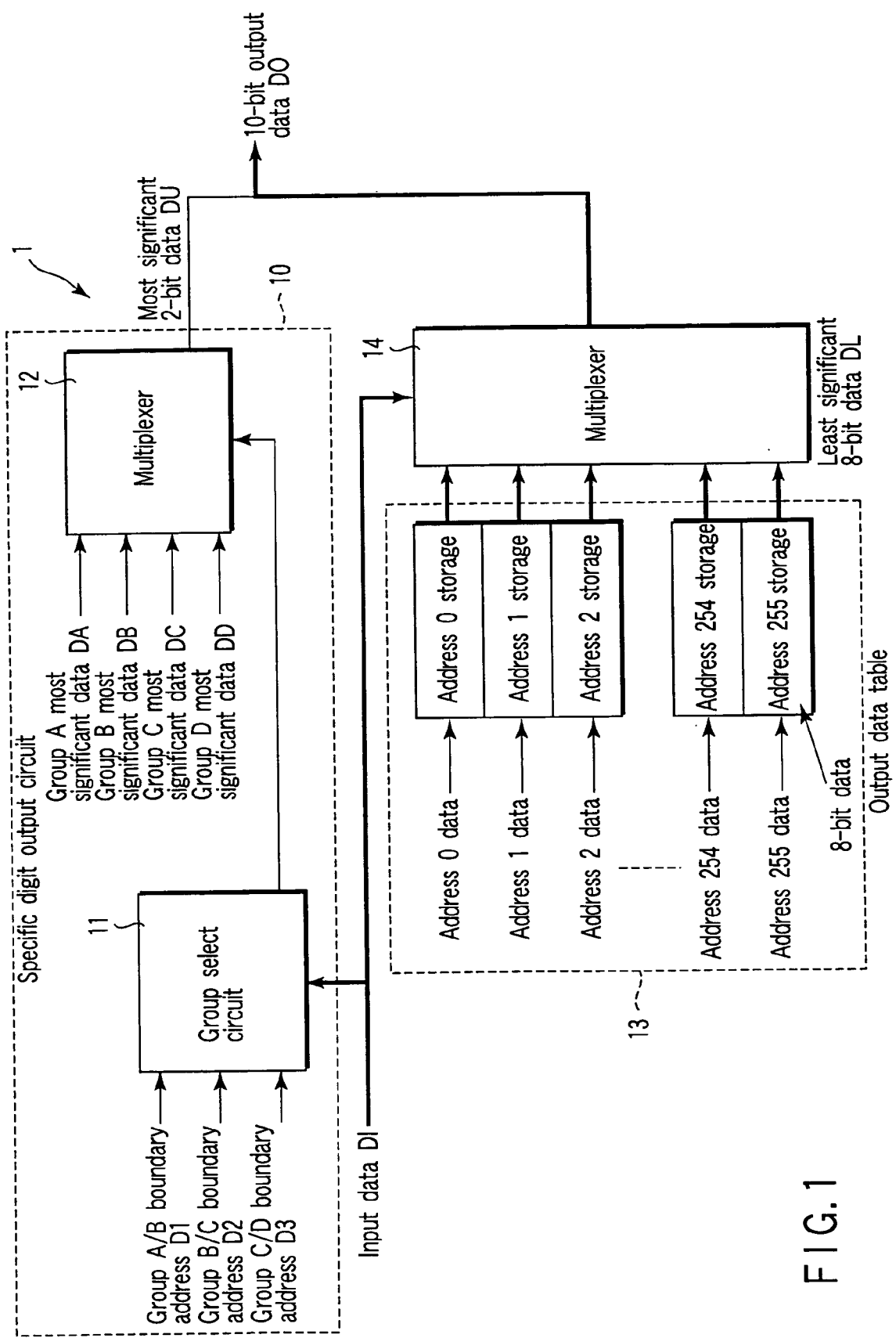
F I G. 1

DATA CONVERTING CIRCUIT, DATA CONVERTING METHOD, AND IMAGE FORMING APPARATUS

BACKGROUND OF THE INVENTION

The present invention relates to a data converting circuit to receive an input signal constituted of a plurality of digital signals and subject the input signal to a predetermined data converting process and thereby output an output signal constituted of a plurality of digital signals, and an image forming apparatus using this data converting circuit as an image processing circuit.

Currently, in an image processing circuit or the like of an image forming apparatus such as a digital duplicator, the data converting process is widely employed in which outputs corresponding to input data are prepared and stored in a storage unit as a group of output data, and by selectively outputting the output data from the storage unit, the data is converted so that an appropriate data after the data conversion is supplied to the circuits in subsequent stages. In the image correction of a duplicator, for example, the image data retrieved by a scanner unit is sent to a printer unit, where the image data is subjected to the gamma correction. In such a case, the data converting process is widely employed for image correction corresponding to the scan characteristics of the scanner or the printing characteristics of the printer.

This data converting circuit is so basically structured that all the output signals corresponding to the input signals are prepared and stored in a memory in advance, and therefore a large memory capacity is required as a very heavy burden. In the case where an input data of 8 bits is converted into a corresponding output data of 8 bits to correct the image, for example, a RAM or the memory is required which can store the data of 8 bits for each input data as a data conversion table. In this case, the assumed capacity of the RAM is equal to the number of input data multiplied by 8 bits. For all the combinations of 8 bits, therefore, a memory having a storage capacity of as large as 256×8 bits is required.

A data converting circuit, however, has not necessarily the same number of bits of the output signal as the number of bits of the input signal. Actually, some data converting circuits have output bits different in number from input bits. Japanese Unexamined Patent Publication No. 9-116773, for example, discloses an image processing technique to convert a 10-bit input signal into an 8-bit output signal. According to this technique, in order to reduce the number of output bits, the data is output as a fixed value in the case where the input signal exceeds a predetermined value. Nevertheless, the data converting process is not disclosed for a case in which the number of bits of the output signal is larger than the number of bits of the input signal, and no technique has yet to be disclosed to reduce the actual memory capacity.

Specifically, considering a data converting circuit to convert an 8-bit input data into a 10-bit output data, the capacity of the RAM increases to the number of input data multiplied by 10 bits, and therefore a memory having a storage capacity of 256×10 bits is required. In an ordinary digital signal processing method, however, the data are managed for each 8 bits to secure a predetermined processing speed. Thus, the 10-bit data exceeding 8 bits are handled as 16-bit data, thereby requiring a memory having a storage capacity of 256×16 bits. In the process, the storage capacity of the memory is greatly increased from 256×8 bits to 256×16 bits. This data converting circuit is often arranged in an ASIC or the like, and therefore an increased storage capacity of the RAM comes to pose the problem of a higher cost and an increased power consumption of the devices involved.

BRIEF SUMMARY OF THE INVENTION

The object of the present invention is to provide a data converting circuit to store an output signal corresponding to an input signal beforehand in a memory and subject the output signal to the converting process, a data converting circuit capable of greatly reducing a memory capacity and a data converting method and an image forming apparatus using the same.

According to one aspect of the present invention, there is provided a data converting circuit to receive an input data and convert the input data into an output data, comprising an output data table to store a group of output data corresponding to the values of the input data in advance, a multiplexer to receive the input data and selectively output one data of the output data group stored in the output data table, and a specific digit output circuit to receive the input data, and in accordance with the result of comparison of the input data with the boundary information stored in advance, output an output data of a specific digit included in the output data and not output by the multiplexer.

According to another aspect of the present invention, there is provided a data converting circuit having the aforementioned configuration in which the output data corresponding to the input data are stored in a memory or the like in advance. Nevertheless, unlike in an apparatus to which the present invention is not applied, the output data corresponding to all the input data are not stored in a memory. Specifically, the output data to be converted, or especially the output data of the most significant two digits, are not substantially changed. Such data often assume a predetermined value ("0", for example) successively in accordance with, for example, the size of the input data, and after passing a boundary, assume other values ("1", for example) successively. From this viewpoint, with regard to the most significant two digits of the output data, for example, a memory area is not secured for all the output data corresponding to the input data, and they are not stored in the memory area, but only the boundary information of the input data where the output data is changed are stored, so that the input data and the boundary information are compared with each other, and the output data can be specified in accordance with the result of comparison.

As a result, in the case where an 8-bit input data is converted into a 10-bit output data, for example, unlike in an apparatus to which the present invention is not applied, a memory having a storage capacity of 256×16 bits is not required to be secured. Specifically, an equivalent conversion function can be realized by a memory having a storage capacity of 256×8 bits and a specific digit output circuit including a memory having a storage capacity of several tens of bits and a comparator. In this case, therefore, the storage capacity of the memory required as a data converting circuit can be reduced to about one half, thereby providing a data converting circuit capable of saving the memory greatly.

BRIEF DESCRIPTION OF THE SEVERAL VIEWS OF THE DRAWING

FIG. 1 is a block diagram showing an example of a configuration of a data converting circuit according to the present invention;

DETAILED DESCRIPTION OF THE INVENTION

Figure 2:
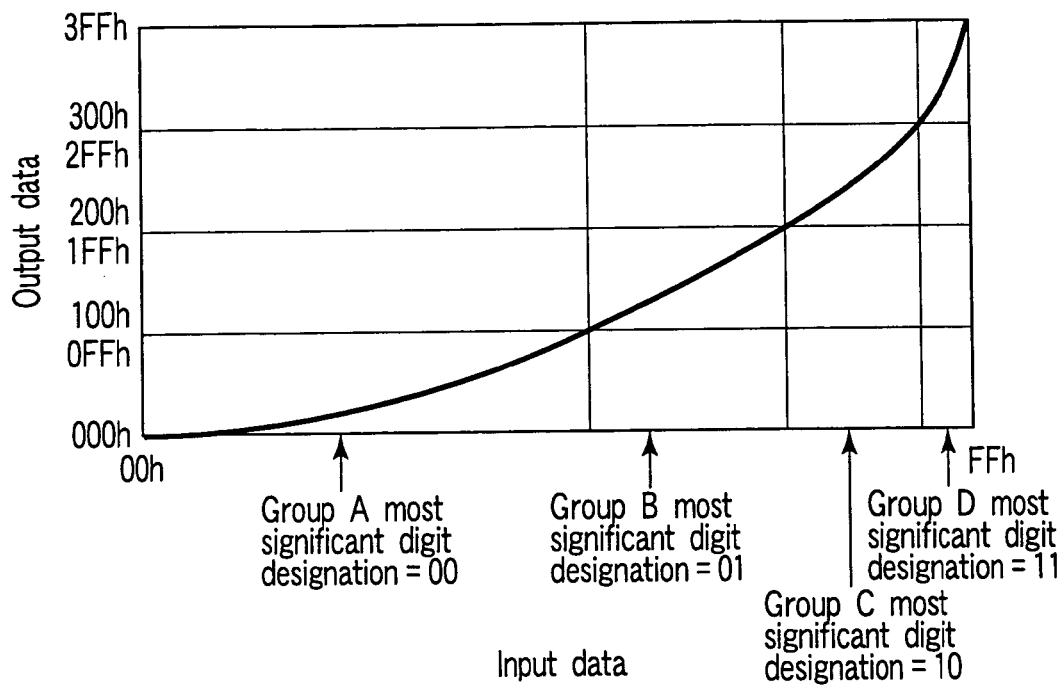
FIG. 2 is a graph showing an example of a converting process of a data converting circuit according to the present invention.
Figure 3:
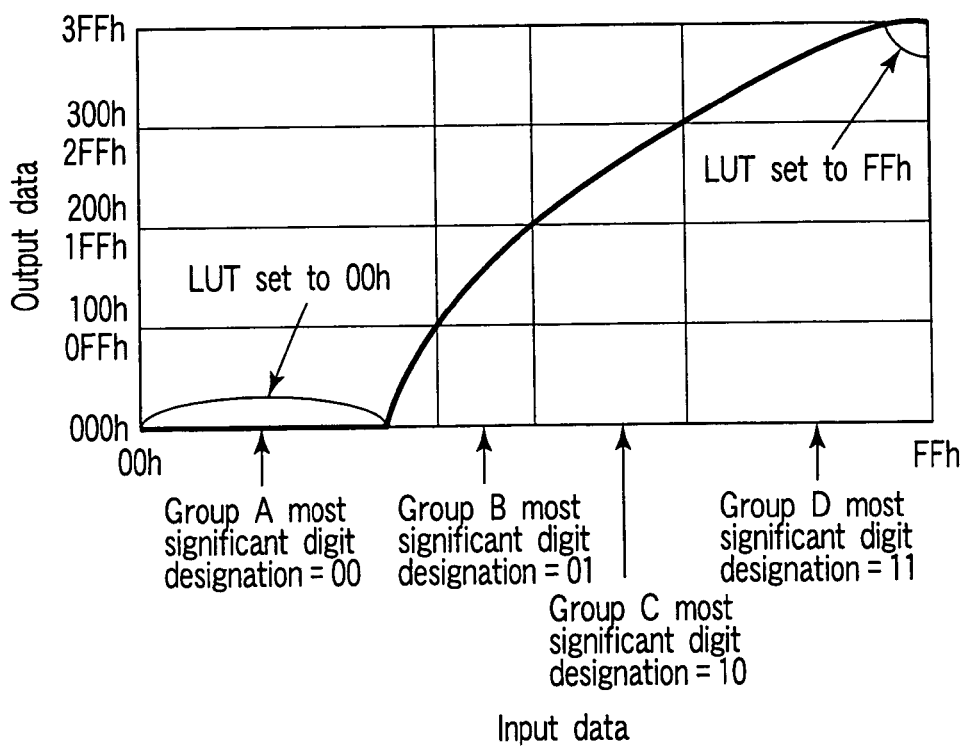
FIG. 3 is a graph showing another example of the converting process of a data converting circuit according to the present invention.
Figure 4:
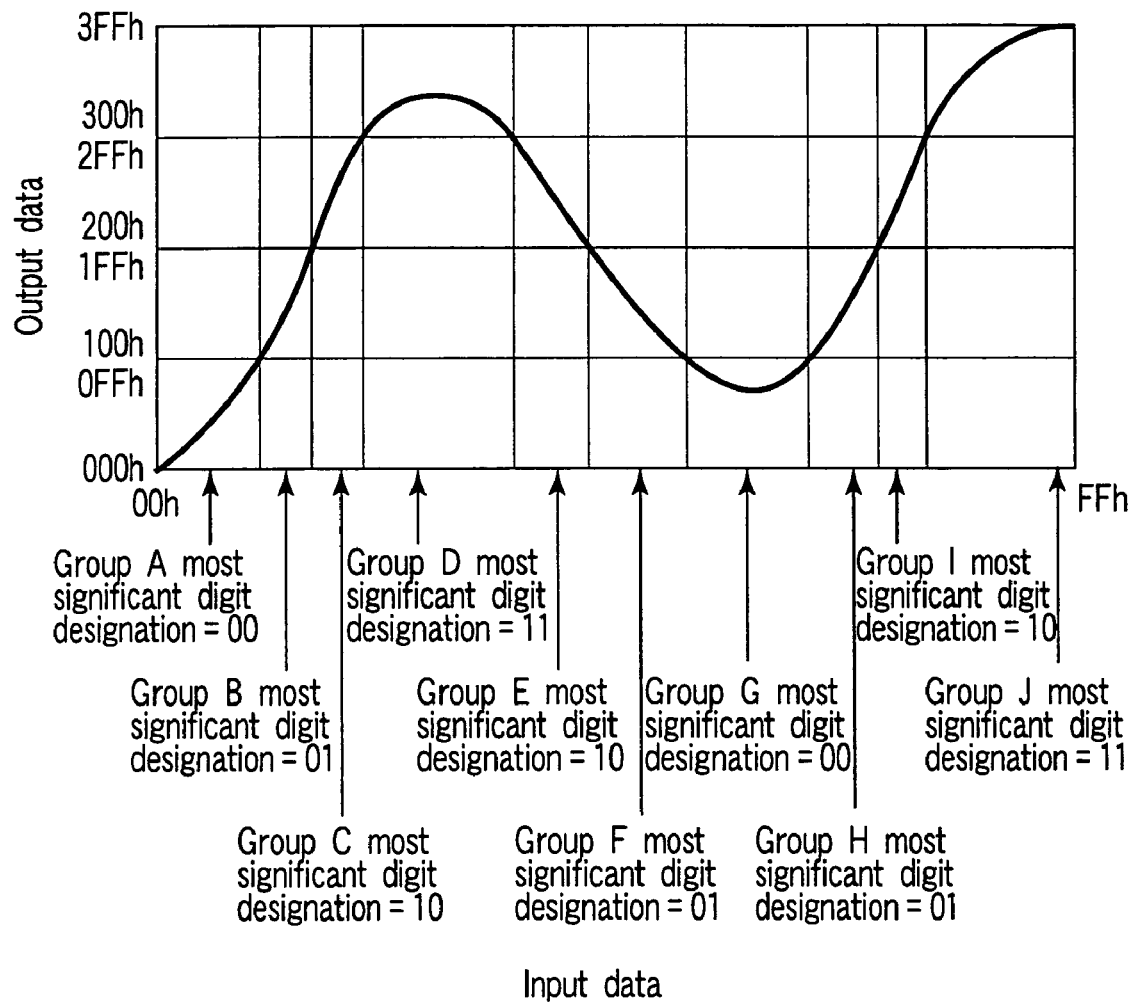
FIG. 4 is a graph showing still another example of a converting process of a data converting circuit according to the present invention.

A data converting circuit, a data converting method and an image forming apparatus using the same according to the present invention will be explained in detail below referring to the accompanying drawings. FIG. 1 is a block diagram showing an example of a configuration of a data converting circuit according to the present invention, FIG. 2 a graph showing an example of the converting process of the data converting circuit according to the present invention, FIGS. 3 and 4 are graphs showing another example of the converting process, and FIG. 5 a block diagram showing an example of a configuration of an image forming apparatus using a data converting circuit according to the present invention.

Data Converting Circuit

A data converting circuit 1 according to the present invention comprises, as shown in FIG. 1, a specific digit output circuit 10 supplied with an input data DI from an external source, an output data table 13 similarly supplied with an input data DI, and a multiplexer 14 supplied with the data stored in the output data table 13. The specific digit output circuit 10 receives the input data DI and outputs only the output data DU of specific digits (the most significant two digits, for example) of the output data DO. Group boundary addresses D1 to D3 are supplied to and stored in an internal memory of the specific digit output circuit 10. A multiplexer 12 connected to the specific digit output circuit 10 and supplied with a group select data DS is supplied with and has stored therein a group A most significant data DA to a group D most significant data DD. Also, the output data table 13 has a memory such as a RAM (random access memory) and has stored therein the output data corresponding to the input data in advance. The multiplexer 14 is a circuit to receive the input data DI and output by selectively reading the output data corresponding to the input data DI from the output data table 13.

Operation

The data converting circuit 1 having this configuration performs the data converting process described below. According to this embodiment, in order to exhibit the features and the effects of the present invention more significantly, a data converting circuit is assumed which receives an input data of 8 bits and produces an output data of 10 bits. The input data DI supplied to the data converting circuit are accessed by a group select circuit 11, and classified into one of the four groups A to D corresponding to the input data DI and output as a group select data DS.

The information to classify the groups and output the group select data includes a group A/B boundary address D1, a group B/C boundary address D2 and a group C/D boundary address D3 supplied to and stored in the group select circuit 11 in advance. The boundary addresses D1 to D3 are compared with the input data DI by a comparator circuit not shown. In accordance with the result of this comparison, which one of the groups A to D is associated with the input data DI is determined. The data thus determined is output to the multiplexer 12 as a group select data DS.

In accordance with the group select data DS obtained by the group select circuit 11, one of the group A most significant data DA, the group B most significant data DB, the group C most significant data DC and the group D most significant data DD set and stored as corresponding groups is output by the multiplexer 12 as a most significant 2-bit data DU of the 10-bit output data.

In parallel with this, the least significant 8-bit output data DL corresponding to the input data DI are selected from the output data table 13 accommodating the output data (address 0 data to address 255 data) in advance, and output from the multiplexer 14 as the least significant 8-bit data DL. The data of the most significant 2 bits and the least significant 8 bits thus obtained are combined and handled as a 10-bit output data DO.

The data stored for data conversion in the specific digit output circuit 10, therefore, include three address data and four most significant 2-bit data which are the information requiring a very small memory capacity. Unlike an apparatus to which the present invention is not applied, therefore, a memory having a storage capacity of as much as 255×8 bits is not required, thereby making it possible to save the memory capacity considerably.

The case shown in the graphs of FIGS. 2 to 4 will be explained as an example of the converting process executed in the data converting circuit according to the present invention. In FIG. 2 where an example of the result of data conversion is shown, the abscissa represents an input and the ordinate an output. Specifically, the value of the most significant two bits is "00" in group A, "01" in group B, "10" in group C and "11" in group D. As shown in these graphs, the output data of the most significant two bits are not necessarily in a form corresponding to all the 8-bit input data. Instead, the boundary address is designated for executing the comparison, and by determining which group the input data DI is associated with, the data conversion of the eight input bits and the 10 output bits can be realized.

As described above, in the case where the input data DI can be classified into a comparatively small number of groups and defined in correspondence with the most significant 2-bit output data DU, the memory capacity can be greatly saved by the method described above.

With the data converting circuit 1 according to the present invention, the linear (proportional) data conversion between input and output as shown in FIG. 2 is possible. Also in the case of other than a simple linear conversion as shown in FIGS. 3 and 4, the data conversion is possible in similar fashion. Specifically, as shown in FIG. 3, in the case where classification into group A, group B, group C and group D is possible and the most significant two bits can be uniquely set accordingly, the data conversion is possible by the method according to the present invention.

Also in the case of FIG. 4, the groups are so many and include group A, group B, group C, group D, group E, group F, group G, group H, group I and group J. As long as the group boundary information is clarified and the most significant two bits of each group can be uniquely set, however, the data conversion is possible in similar fashion by the method according to the present invention. In this case, too, the memory capacity can be saved greatly.

Apart from the aforementioned embodiment having a large data width at the output side such as 10 bits as compared with the input of 8 bits, the present invention is applicable also to the case in which the output data width is as small as two bits as compared with an 8-bit input, using a circuit having only the most significant two-bit data as shown in FIG. 1. Even in the case where the input data and the output data have an equal width, a similar circuit configuration can be used. Further, the data converting circuit according to the present invention can be used for the data conversion of an arbitrary number of bits.

Image Forming Apparatus using the Data Converting Circuit According to the Present Invention Next, an example of an image forming apparatus using a data converting circuit according to the present invention for a gamma correcting circuit as an example of an image processing unit will be described below.

Figure 5:
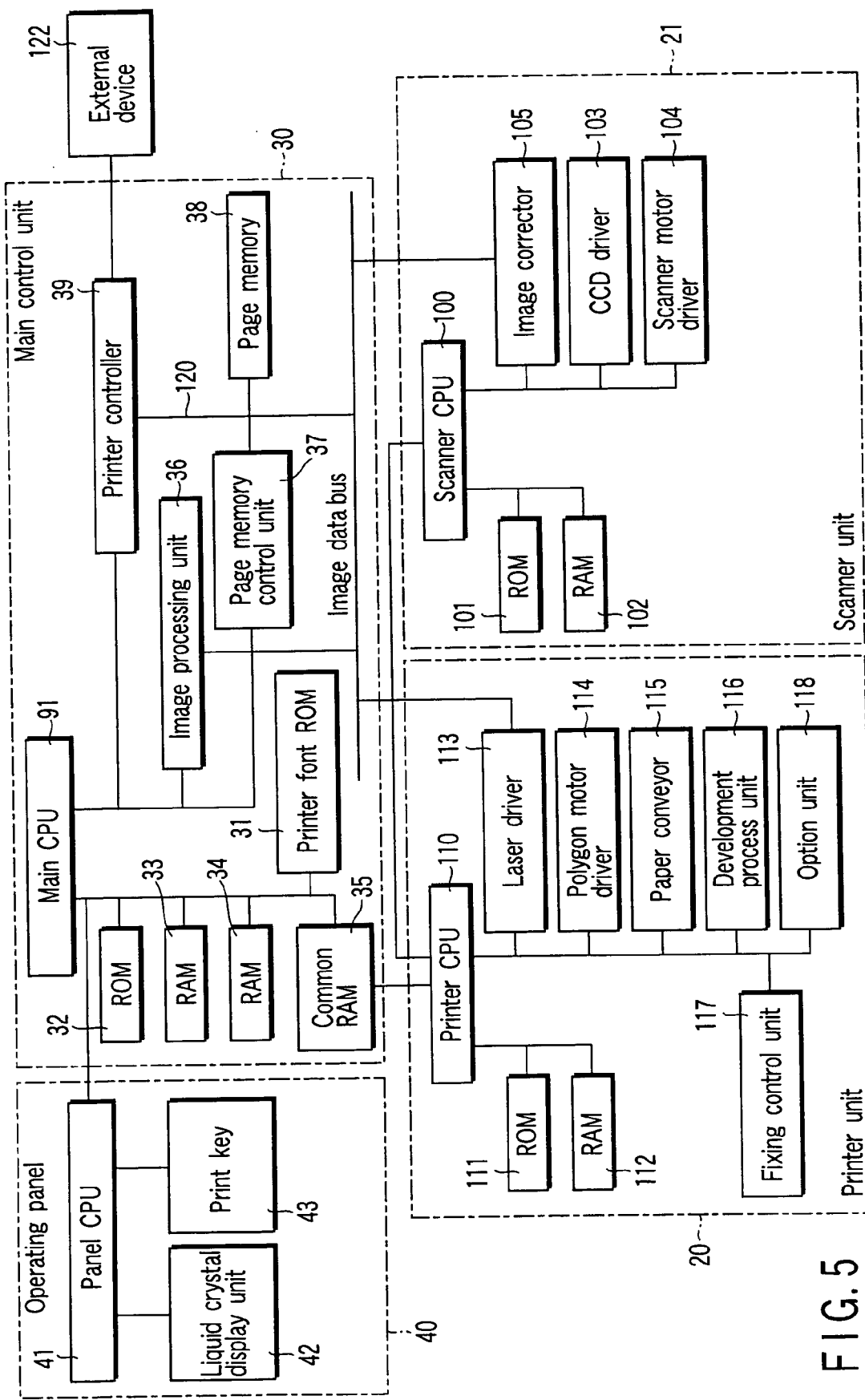
FIG. 5 is a block diagram showing an example of a configuration of an image forming apparatus using a data converting circuit according to the present invention.

FIG. 5 is a block diagram schematically showing a signal flow to electrically connect and control a digital duplicator using a data converting circuit according to the present invention for an image processing unit. In FIG. 5, a control system is configured by three CPUs (central processing units) including a main CPU 91 in a main control unit 30, a scanner CPU 100 of a scanner unit 21 and a printer CPU 110 of a printer unit 20.

The main CPU 91 is to establish bidirectional communication with the printer CPU 110 through a common RAM 35. The main CPU 91 issues an operation command, and the printer CPU 110 returns the status. The printer CPU 110 and the scanner CPU 100 carry out the serial communication so that the printer CPU 110 issues an operation command while the scanner CPU 100 returns the status.

The operating panel 40 includes a print key 43, a liquid crystal display unit 42 and a panel CPU 41 connected to them, and is connected to the main CPU 91.

The main control unit 30 is configured by a main CPU 91, a ROM 32, a RAM 33, an NVRAM 34, a common RAM 35, an image processing unit 36, a page memory control unit 37, a page memory 38, a printer controller 39 and a printer font ROM 31.

The main CPU 91 is in charge of overall control. The ROM 32 has stored therein a control program or the like. The RAM 33 is to store data temporarily.

The NVRAM (nonvolatile RAM) 34 is a nonvolatile memory backed up with a battery (not shown) and adapted to hold the stored data even when power is shut down.

The common RAM 35 is used to establish bidirectional communication between the main CPU 91 and the printer CPU 110.

The page memory control unit 37 is to store and read the image information in and from the page memory 38. The page memory 38 has an area capable of storing a plurality of pages of image information and is so formed as to be able to store, page by page, the compressed data of the image information from the scanner unit 4.

The printer font ROM 31 has stored therein the font data corresponding to the print data. The printer controller 39 is such that the print data from an external device 122 such as a personal computer is developed in the image data using the font data stored in the printer font ROM 31 with a resolution corresponding to the data indicating the resolution of the printer data.

The scanner unit 4 is configured by a scanner CPU 100 in charge of overall control, a ROM 101 having stored therein a control program or the like, a RAM 102 to store data, a CCD driver 103 to drive a licenser 34, a scanning motor driver 104 to control the rotation of a scanning motor to move an exposure lamp and a mirror, and an image correcting unit 105.

The printer unit 20 is configured by a printer CPU 110 in charge of overall control, a ROM 111 having stored therein a control program or the like, a RAM 112 to store data, a laser driver 113 to drive a semiconductor laser oscillator, a polygon motor driver 114 to drive a polygon motor of the laser exposure unit, a transport control unit 115 to control the transportation of the paper P along a transport path, a process control unit 116 to control the process of charging, development and transfer using a charger, a developer and a transfer charger, respectively, a fixing control unit 117 to control a fixing unit, and an option control unit 118 to control an option.

The image processing unit 36, the page memory 39, the printer controller 39, the image correcting unit 105 and the laser driver 113 are connected to each other through an image data bus 120.

Application of Data Converting Circuit

In the image forming apparatus described above, the data converting circuit 1 according to the present invention is used for the image processing unit 36 as an example. For example, it is used for a gamma correcting circuit not shown. The gamma correcting circuit performs the correcting operation to reproduce an image in the form as natural as possible by correcting the deflection of the characteristics of such devices as the display unit, the camera, the scanner and the drum. The output data corresponding, in one-to-one relation, to the input data is stored in a memory for conversion process. In the process, all the output data are not necessarily stored in the memory, but as in the data converting circuit according to the present invention, substantially the same data conversion as in the case where all the output data are stored in a memory is made possible by defining the groups with the boundary information provided for the output data of the most significant two digits and outputting by setting the corresponding output data of two digits or the like.

Also, the data converting circuit according to the present invention is not limited to the gamma correcting circuit described above but widely applied also to other data converting circuits as long as they perform the data converting process in which the input data and the output data are continuously processed in unique correspondence to each other.

Further, apart from the configuration including the specific digit output circuit 10, the output data table 13 and the multiplexer 14 shown in FIG. 1, the output data table 13 and the multiplexer 14 are not necessarily required, but a configuration including the specific digit output circuit 10 alone can constitute a data converting circuit. In this case, the memory capacity can be saved remarkably.

As described above in detail, in the data converting circuit according to the present invention, all the output data corresponding to the input data are not stored in the table, but with regard to the output data of specific digits, the boundary information of the input data and the corresponding specific digit output data are stored and output according to the result of comparison of the input data. In this way, a data converting circuit capable of saving the memory area greatly and an image forming apparatus using the data converting circuit are provided.

What is claimed is:

1. A data converting circuit which receives 8 bit input data and converts the 8 bit input data into 10 bit output data, comprising:

a group select circuit which receives the 8 bit input data, compares the 8 bit input data with boundary information stored in advance, and in accordance with a result of the comparison, selects the 8 bit input data as one of a plurality of groups and outputs a group select signal;

a first multiplexer which receives the group select signal from the group select circuit and outputs most significant 2 bit data corresponding to most significant 2 bits of the 10 bit output data;

an output data table which stores in advance a least significant 8 bit data group corresponding to least significant 8 bits of the 10 bit output data; and a second multiplexer which receives the 8 bit input data and selectively outputs a least significant 8 bit data group stored in the output data table and corresponding to the least significant 8 bits of the 10 bit output data.

2. An image forming apparatus, comprising:

a data converting circuit which receives 8 bit input data, and converts the 8 bit input data into 10 bit output data;

a group select circuit which receives the 8 bit input data, compares the 8 bit input data with boundary information stored in advance and in accordance with a result of the comparison, selects the 8 bit input data as one of a plurality of groups and outputs a group select signal;

a first multiplexer which receives the group select signal from the group select circuit and outputs most significant 2 bit data corresponding to most significant 2 bits of the 10 bit output data;

an output table which stores in advance a least significant 8 bit data group corresponding to least significant 8 bits of the 10 bit output data;

a second multiplexer which receives the 8 bit input data and selectively outputs a least significant 8 bit data group stored in the output data table and corresponding to the least significant 8 bits of the 10 bit output data; and a printer unit which forms an image on a recording medium based on the output data output from the data converting circuit.

3. A data converting method, comprising:

receiving 8 bit input data;

comparing the 8 bit input data with boundary information stored in advance;

selecting the 8 bit input data as one of a plurality of groups in accordance with a result of the comparison;

outputting a group select signal;

receiving the group select signal;

outputting most significant 2 bit data corresponding to most significant 2 bits of 10 bit output data;

storing in advance, a least significant 8 bit data group corresponding to least significant 8 bits of the 10 bit output data;

receiving the 8 bit input data; and selectively outputting a least significant 8 bit data group previously stored and corresponding to the least significant 8 bits of the 10 bit output data.

4. A method for forming an image, comprising:

receiving 8 bit input data;

comparing the 8 bit input data with boundary information stored in advance;

selecting the 8 bit input data as one of a plurality of groups in accordance with a result of the comparison;

outputting a group select signal;

receiving the group select signal;

outputting most significant 2 bit data corresponding to most significant 2 bits of 10 bit output data;

storing in advance, a least significant 8 bit data group corresponding to least significant 8 bits of the 10 bit output data;

receiving the 8 bit input data;

selectively outputting a least significant 8 bit data group previously stored and corresponding to the least significant 8 bits of the 10 bit output data; and forming an image on a recording medium based on the 10 bit output data.

* * * * *